United States Patent [19]

Gilbert et al.

[11] Patent Number: 5,727,290
[45] Date of Patent: Mar. 17, 1998

[54] ERGONOMIC ATTACHMENT DEVICE FOR A PORTABLE ELECTRONIC APPARATUS

[75] Inventors: April R. Gilbert, Fort Worth; Jan M. McKinnis, North Richland Hills; Bettina Meles, Southlake, all of Tex.

[73] Assignee: Motorola, Inc., Schaumburg, Ill.

[21] Appl. No.: 769,479

[22] Filed: Dec. 20, 1996

[51] Int. Cl.⁶ .................. A44B 21/00; A45F 5/00
[52] U.S. Cl. .................. 24/3.1; 24/3.11; 24/3.9; 24/3.7; 24/3.12; 224/269
[58] Field of Search .................. 24/3.11, 3.1, 3.5, 24/3.7, 3.9, 563; 40/315, 586; 224/269, 271, 252; D14/191, 192

[56] References Cited

U.S. PATENT DOCUMENTS

| | | | |
|---|---|---|---|
| 2,326,558 | 8/1943 | Pelz | 24/3.11 |
| 4,741,074 | 5/1988 | Budano, II et al. | 24/3.11 |
| 4,956,895 | 9/1990 | Hayasaka | 24/3.11 |
| 5,016,326 | 5/1991 | Goldenberg | 24/3.11 |
| 5,054,170 | 10/1991 | Otrusina | 24/3.1 X |
| 5,261,583 | 11/1993 | Long et al. | 24/3.7 X |
| 5,274,885 | 1/1994 | Hellweg | 24/3.12 |
| 5,375,749 | 12/1994 | Oliva | 24/3.9 X |
| 5,385,282 | 1/1995 | Chen | 24/3.11 X |
| 5,426,825 | 6/1995 | Soren et al. | 24/490 |
| 5,452,497 | 9/1995 | Peng | 24/3.11 |
| 5,499,429 | 3/1996 | Higginbotham | 24/3.5 |
| 5,533,656 | 7/1996 | Bonaldi | 224/269 X |
| 5,584,423 | 12/1996 | Wang | 224/269 X |
| 5,604,958 | 2/1997 | Anscher | 24/3.1 |

Primary Examiner—Peter M. Cuomo
Assistant Examiner—Robert J. Sandy
Attorney, Agent, or Firm—Pablo Meles

[57] ABSTRACT

A portable electronic device (50) that ergonomically attaches to an external article (64) includes a housing (52) for containing the portable electronic device and an ergonomic attachment device (51) for attaching the portable electronic device to the external article. The ergonomic attachment device includes a first portion (54) coupled to a contact portion (52) on the portable electronic device, wherein the first portion has a first end (58) and a second end (60) and a second portion (56) having a first end hinged to the first end of the first portion and a second end (62) that clasps with the second end of the first portion, wherein the first portion and the second portion form a button holder that can ergonomically mount upon a button on the external article.

10 Claims, 3 Drawing Sheets

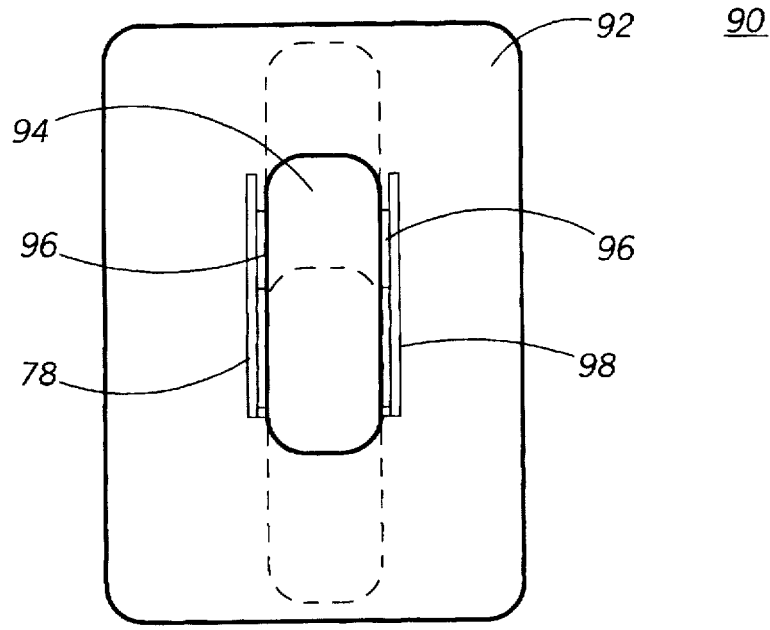
FIG. 5
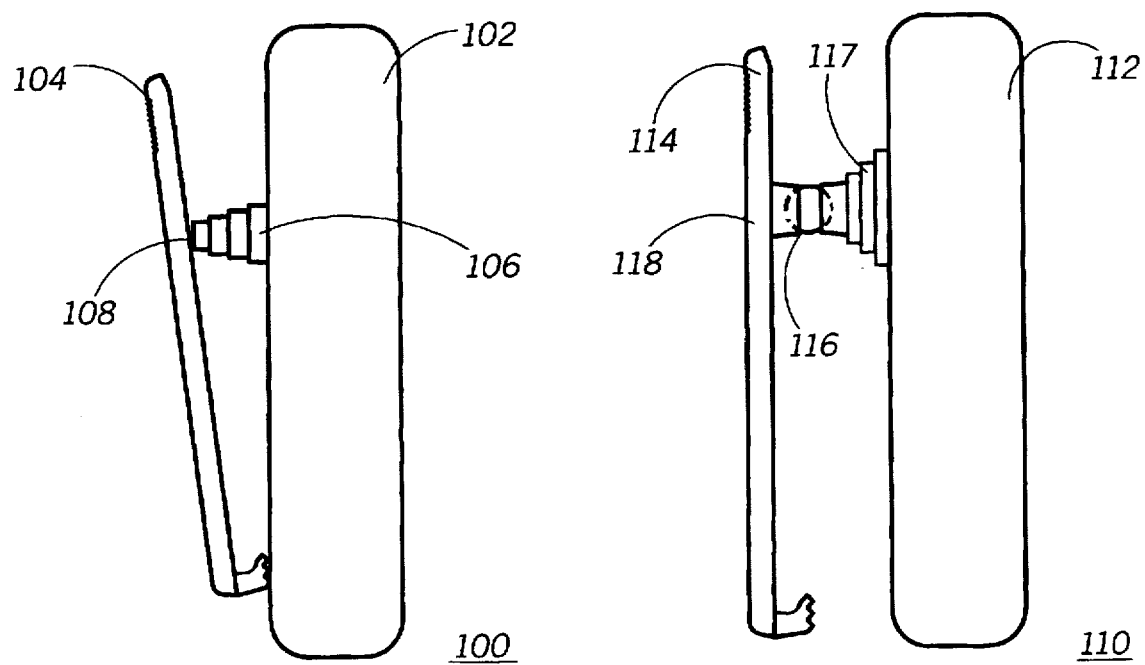
FIG. 6  FIG. 7

ERGONOMIC ATTACHMENT DEVICE FOR A PORTABLE ELECTRONIC APPARATUS

FIELD OF THE INVENTION

This invention relates in general to attachment devices for portable electronic devices and more specifically to ergonomically adjustable attachment devices for portable electronic devices.

BACKGROUND OF THE INVENTION

Portable electronic devices such as selective call receivers or pagers are generally carried by the user and are typically belt worn using a conventional clip attached either to the portable electronic device itself or to a holster that holds the electronic device. These clips are primarily designed for attachment to a user's belt, waist band, or reinforced pocket. Business attire, particularly for women, typically fail to include belts, bands or pockets and therefore make the carrying of pagers awkward to the point that some users refuse to wear pagers when unsuitable clothing is worn. If a user attempts to clip a pager to clothing for which the pager clip was not designed, the pager can possibly dislodge and become lost. In addition, even when placing their pagers on a belt or near their waistline, some users complain of discomfort. For instance, when sitting down or bending, a fixed clip attached to a belt will fail to adjust for optimum comfort. Depending on a particular user's shape, a pager could jab into one's waistline or lower rib. Thus, what is needed is an ergonomic attachment device for pagers and other small portable electronic devices that can either adjust or eliminate the uncomfortable situations described.

BRIEF DESCRIPTION OF THE DRAWINGS

FIG. 5 is a rear plan view of a clip in accordance with an embodiment of the present invention.

FIG. 6 is a side view of clip in accordance with another embodiment of the present invention.

FIG. 7 is a side view of another clip in accordance with another embodiment of the present invention.

DETAILED DESCRIPTION

Figure 1:
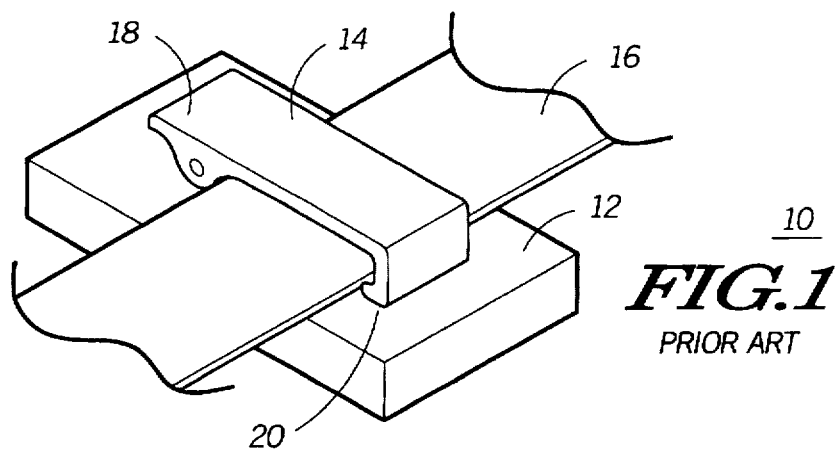
FIG. 1 is a perspective view of a pager including a conventional clip attached to an external article.

Referring to FIG. 1, there is shown a perspective view of a conventional pager 10 having a housing 12 and clip 14 for attachment to an external article 16 such as a belt. The clip 14 is pivotally mounted to the back surface of the pager wherein the clip pivots about a first end 18 and is biased to remain closed at a second end 20 of the clip 14. As shown, the user can secure the pager 10 in a fixed manner to an article of clothing to prevent the loss of the pager, but the pager can not be adjusted except for possibly sliding the pager across plane of the belt. The conventional clip 14 prevents pager motion and hence creates discomfort when a person's body does not conform to the fixed position initially set as a person moves about in their environment.

Figure 2:
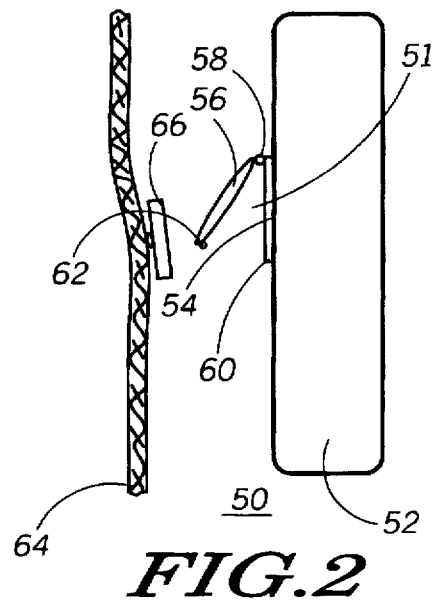
FIG. 2 is a side view of a portable electronic product using a ergonomic attachment device such as a button cover in accordance with the present invention.

Referring to FIG. 2, an ergonomic attachment device 51 for attaching a portable electronic device 50 to an external article 64 having a button 66 is shown. The device 51 comprises a first portion 54 coupled to a contact portion 52 on the portable electronic device, wherein the first portion 54 has a first end 58 and a second end 60. The ergonomic attachment device 51 has a second portion 56 having a first end hinged or integrally coupled to the first end 58 of the first portion and a second end 62 that is integrally coupled or clasps with a second end of the first portion. In other words, the first portion and the second portion preferably form a button holder that can ergonomically mount upon the button 66 on the external article 64. The button holder can take the form a of a single piece of plastic that allows for a friction fit with the button. In this case, no "hinge" on the first end or "clasp" on the second end would be required. But preferably, the button holder takes the form of a hinged device that retains a button once the button is clasped with the two portions of the device 51. Additionally, the device 51 could either be integrally formed into the housing of the portable electronic device or onto a holster that holds the portable electronic device. Thus, the contact portion 52 should be viewed as either being the portable electronic device or the holster. Note that the device 51 could also be attached to the holster or portable electronic device with either adhesive or screws if the device 51 is not integrally formed into the contact portion 52.

Figure 3:
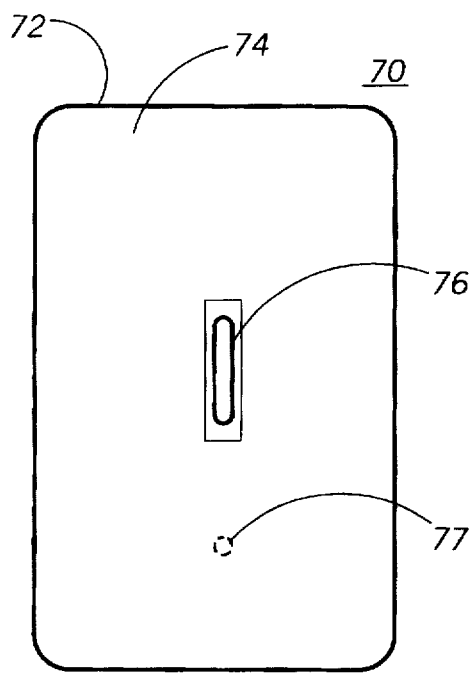
FIG. 3 is a portable electronic product housing or holster with a button hole or rivet receiving area in accordance with the present invention.
Figure 4:
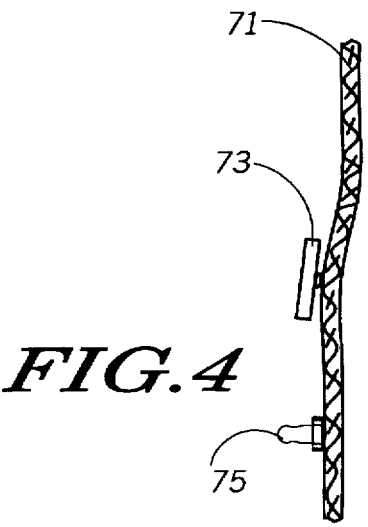
FIG. 4 is an external article with a button or rivet in accordance with the present invention.

Referring to FIGS. 3 and 4, a portable electronic device 70 that ergonomically attaches to an external article 71 having a male portion (73 or 75) is shown in accordance with the present invention. The male portion is preferably either a button (73) or a rivet (75). The portable electronic device comprises a housing 72 for containing the portable electronic device. (Thus, as described above with respect to FIG. 2, the housing 72 in FIG. 3 could either be the portable electronic device housing itself or a holster for holding the portable electronic device.) The portable electronic device also comprises a receiving portion (76 or 77) integrally formed in a back portion 74 of the housing, wherein the receiving portion permits the insertion of the male portion for retention of the portable electronic device to the external article. Preferably, the receiving portion is a button hole (76) for receiving the insertion of the button (73) or alternatively a rivet receptacle (77) for mating with the rivet (75). The rivet could easily be similar to those commonly found on jeans, but preferably a little larger for better retention.

In an alternative embodiment, the male portion is a button on the external article and the receiving portion is formed from a hole in a pouch (74) integrally formed to a back portion of the housing, wherein the hole (76) for permits the mounting of the housing by insertion of the button on the external article. The pouch 74 is preferably formed from any suitable material that is pliable for insertion of a button. Such materials can include denim, cotton, leather, rubber, plastic, polyester, vinyl, wool, Gortex, nylon, or any combination of these materials.

Referring to FIG. 5, a clip 94 for attaching a portable electronic device 90 to an external article in accordance with the present invention is shown. The clip preferably comprises a first end for coupling the clip to the portable electronic device wherein the first end is pivotably attached to the portable electronic device such that the clip can be rotated about a pivot point between an open position and a closed position and wherein the pivot point can be adjusted in multiple planes relative to the portable electronic device while the clip remains biased in a closed position. The clip also preferably comprises a second end biased to remain in a closed position. As shown, the clip 94 preferably comprises a locking mechanism 96 used to fix the pivot point once the pivot point has been vertically adjusted to suit a particular user's dimensions. As shown in the embodiment of FIG. 5, the clip can be vertically adjusted by sliding the clip up and down a set of rails 98 until the user selectively locks the clip in position using the locking mechanism 96. The locking mechanism is preferably a ratcheting type scheme, but other schemes are contemplated within the scope and spirit of the present invention.

Referring to FIG. 6, a portable electronic device 100, preferably in the form of a pager, comprises a housing 102 (either the holster or pager housing itself) having a clip 104 having a first end for coupling the clip to the portable electronic device wherein the first end is pivotably attached to the portable electronic device such that the clip can be rotated about a pivot point 108 between an open position and a closed position and wherein the pivot point can be adjusted in multiple planes relative to the portable electronic device while the clip remains biased in a closed position. In this instance, the pivot point is adjusted laterally (or perpendicularly) relative to the portable electronic device. Preferably, the first end comprises a telescoping mechanism to allow the first end to move laterally toward or away from the portable electronic device while the second end remains biased in a closed position when the pivot point is either laterally moved away or towards the portable electronic device. Ideally, the telescoping mechanism is self adjusting so that as a person bends, the force applied to the telescoping mechanism releases out or returns to an original position as necessary. In order for the telescoping mechanism to self adjust, a spring mechanism may be required to allow the pivot point to return after it has been released. For additionally rigidity and sturdiness, the telescoping mechanism can further include a ratcheting mechanism. Alternatively, the clip could be moved laterally toward or away from the portable electronic device using an elastomeric compressible mechanism.

Referring to FIG. 7, a portable electronic device 110, preferably in the form of a pager, comprises a housing 112 (either the holster or pager housing itself) having a clip 114 having a first end for coupling the clip to the portable electronic device wherein the first end is pivotably attached to the portable electronic device such that the clip can be rotated about a pivot point 118 between an open position and a closed position and wherein the pivot point can be adjusted in multiple planes relative to the portable electronic device while the clip remains biased in a closed position. In this instance, the pivot point 118 is preferably adjusted in multiple planes by using a ratcheting ball and cup connection 116. Thus, whichever way a person bends, the pager and clip will conform to the user's present position. For further flexibility, the clip could optionally include (as in device 100 of FIG. 6) a telescoping mechanism 117 to allow the first end to move laterally toward or away from the portable electronic device while the second end remains biased in a closed position when the pivot point is either laterally moved away or towards the portable electronic device.

Figure 8:
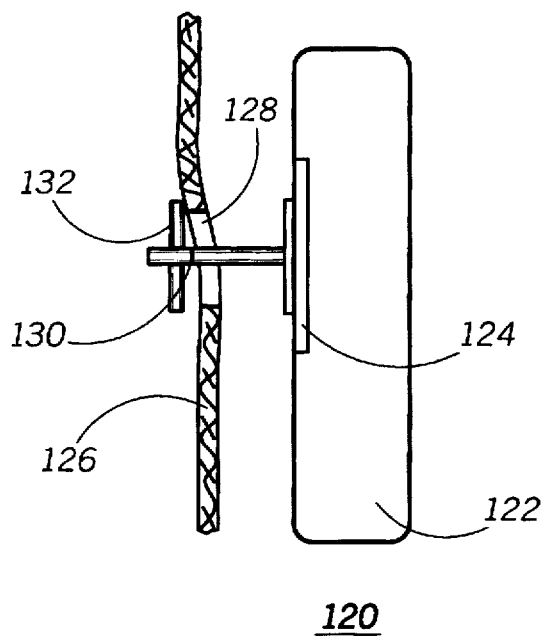
FIG. 8 is a side view of a clip in accordance with an embodiment of the present invention.

Finally, referring to FIG. 8, a portable electronic device 120 is shown having a housing 122 with yet another means of ergonomically attaching the portable electronic device 120 to an external article 126 having a button hole 128. Essentially, the housing would include an embedded cuff link that would have a first portion 124 embedded within the housing 122, a linking stem 130 and a rotatable second portion 132. When the linking stem 130 and the rotatable second portion 132 are coplanar, they would be inserted into the button hole 128. Once inserted, the rotatable second portion 132 would be rotated to a perpendicular position relative to the linking stem 130. Thus, in this manner the embedded cuff link retains the portable electronic device to an external article.

It should be understood that the disclosed embodiments are merely examples and the invention is not restricted thereto. It will be understood by those skilled in the art that variations and modifications can be made within the scope and spirit of the present invention as defined by the appended claims.

We claim:

1. A portable electronic device that ergonomically attaches to an external article having a male portion, comprising:

a housing for containing the portable electronic device; and a receiving portion integrally formed to a back portion of the housing, wherein the receiving portion permits the insertion of the male portion for retention of the portable electronic device to the external article, wherein the male portion is a button on the external article and the receiving portion is a pouch integrally formed to a back portion of the housing, wherein the pouch further includes a hole for permitting the mounting of the housing by insertion of the button on the external article.

2. The portable electronic device of claim 1, wherein the pouch is formed from a material selected from the group consisting of denim, cotton, leather, rubber, plastic, polyester, vinyl, wool, Gortex, nylon, and any combination thereof.

3. A portable electronic device that ergonomically attaches to an external article having a male portion, comprising:

a housing for containing the portable electronic device; and a receiving portion integrally formed to a back portion of the housing, wherein the receiving portion permits the insertion of the male portion for retention of the portable electronic device to the external article, wherein the male portion is a protruding rivet from the external article which mates with the receiving portion integrally formed to the back portion of the housing.

4. A clip attached to a housing supporting a portable electronic device to an external article, the clip comprising:

a first end for coupling the clip to the housing wherein the first end is pivotably attached to the housing such that the clip can be rotated about a pivot point between an open position and a closed position and wherein the pivot point can be adjusted in multiple planes using a ratcheting ball and joint connection relative to the housing while the clip remains biased in a closed position; and a second end biased to remain in a closed position.

5. A clip attached a housing supporting a portable electronic device to an external article, the clip comprising:

a first end for coupling the clip to the housing wherein the first end is pivotably attached to the housing such that the clip can be rotated about a pivot point between an open position and a closed position and wherein the pivot point can be adjusted in multiple planes relative to the housing while the clip remains biased in a closed position and wherein the first end further comprises a telescoping mechanism to allow the first end to move laterally toward or away from the housing while the second end remains biased in a closed position when the pivot point is either laterally moved away or towards the housing; and a second end biased to remain in a closed position.

6. The clip of claim 5, wherein the pivot point moves laterally toward or away from the portable electronic device using a self adjusting telescoping mechanism.

7. The clip of claim 6, wherein the self adjusting telescoping mechanism further uses a ratcheting mechanism.

8. The clip of claim 5, wherein the pivot point moves laterally toward or away from the portable electronic device using an elastomeric compressible mechanism.

9. The clip of claim 4, wherein a locking mechanism is used to fix the pivot point once the pivot point has been adjusted to suit a particular user's dimensions.

10. A portable electronic device that ergonomically attaches to a button hole in an external article, comprising:

a housing for containing the portable electronic device; and an ergonomic attachment device for attaching the portable electronic device to the external article, wherein the ergonomic attachment device comprises:

a first portion embedded within the housing;

a linking stem, the linking stem having a first end and a second end, wherein the first end of the linking stem is coupled to the first portion; and a rotatable second portion coupled to the second end of the linking stem, wherein the ergonomic attachment device is inserted into the button hole when the linking stem and the rotatable second portion are substantially coplanar and wherein the portable electronic device becomes attached to the external article when the rotatable second portion is rotated to a substantially perpendicular position relative to the linking stem.

* * * * *